United States Patent [19]
Tawil et al.

[11] Patent Number: 5,651,602
[45] Date of Patent: Jul. 29, 1997

[54] PORTABLE LIGHT DIFFUSER

[75] Inventors: Joseph N. Tawil, 13900 Pamay Way, Marina Del Ray, Calif. 90292; Steve W. Litt, Van Nuys, Calif.

[73] Assignee: Joseph N. Tawil, Marina Del Ray, Calif.

[21] Appl. No.: 340,779

[22] Filed: Nov. 17, 1994

[51] Int. Cl.⁶ .................................. G03B 15/021
[52] U.S. Cl. ........................ 362/18; 362/17; 362/293; 362/396
[58] Field of Search .......................... 362/3, 16, 17, 362/18, 8, 293, 356, 357, 370, 396, 449; 248/231.71

[56] References Cited

U.S. PATENT DOCUMENTS

| | | |
|---|---|---|
| 1,016,914 | 2/1912 | Christiana ........................ 362/396 |
| 2,009,145 | 7/1935 | Nathan . |
| 2,441,489 | 5/1948 | Jacobs ........................... 362/396 |
| 2,768,284 | 10/1956 | Woolley .......................... 362/16 |
| 4,019,042 | 4/1977 | Baliozian ......................... 362/16 |
| 4,298,920 | 11/1981 | Gluck et al. . |
| 4,446,506 | 5/1984 | Larson . |
| 4,468,720 | 8/1984 | Arai . |
| 4,600,976 | 7/1986 | Callahan . |
| 4,777,566 | 10/1988 | Lowell et al. . |
| 5,093,763 | 3/1992 | Vanderschuit et al. . |
| 5,128,838 | 7/1992 | Brandess . |
| 5,188,443 | 2/1993 | Lowell et al. . |
| 5,289,350 | 2/1994 | Gehrt . |
| 5,311,409 | 5/1994 | King . |
| 5,347,432 | 9/1994 | Chiavetta ........................ 362/352 |

FOREIGN PATENT DOCUMENTS

| | | | |
|---|---|---|---|
| 405062504 A | 3/1993 | Japan . | |
| 371688 | 10/1963 | Switzerland ................ 362/16 |

*Primary Examiner*—Y. My Quach
*Attorney, Agent, or Firm*—Townsend and Townsend and Crew LLP

[57] ABSTRACT

A system for controlling the light cast by a studio light (8) comprises a collapsible light diffuser or soft box (4) having open opposite ends and a light-reflective inner surface for diffusing light passing therethrough. A number of support brackets (40) extend along the outer surface of the soft box and a number of adjustable clamps (6) couple the support brackets to the working end of a light casing (12) so that the soft box is fixed to the light casing for movement therewith. The soft box can be quickly assembled and reassembled for movement between different locations, and it is sufficiently rigid to remain self-supporting when the light source is moved around or redirected. The system further includes a collapsible light container or snoot (10) telescopically coupled to the soft box for adjusting the amount of diffusion of the light to contain or direct the diffused light to a general area on the set.

22 Claims, 3 Drawing Sheets

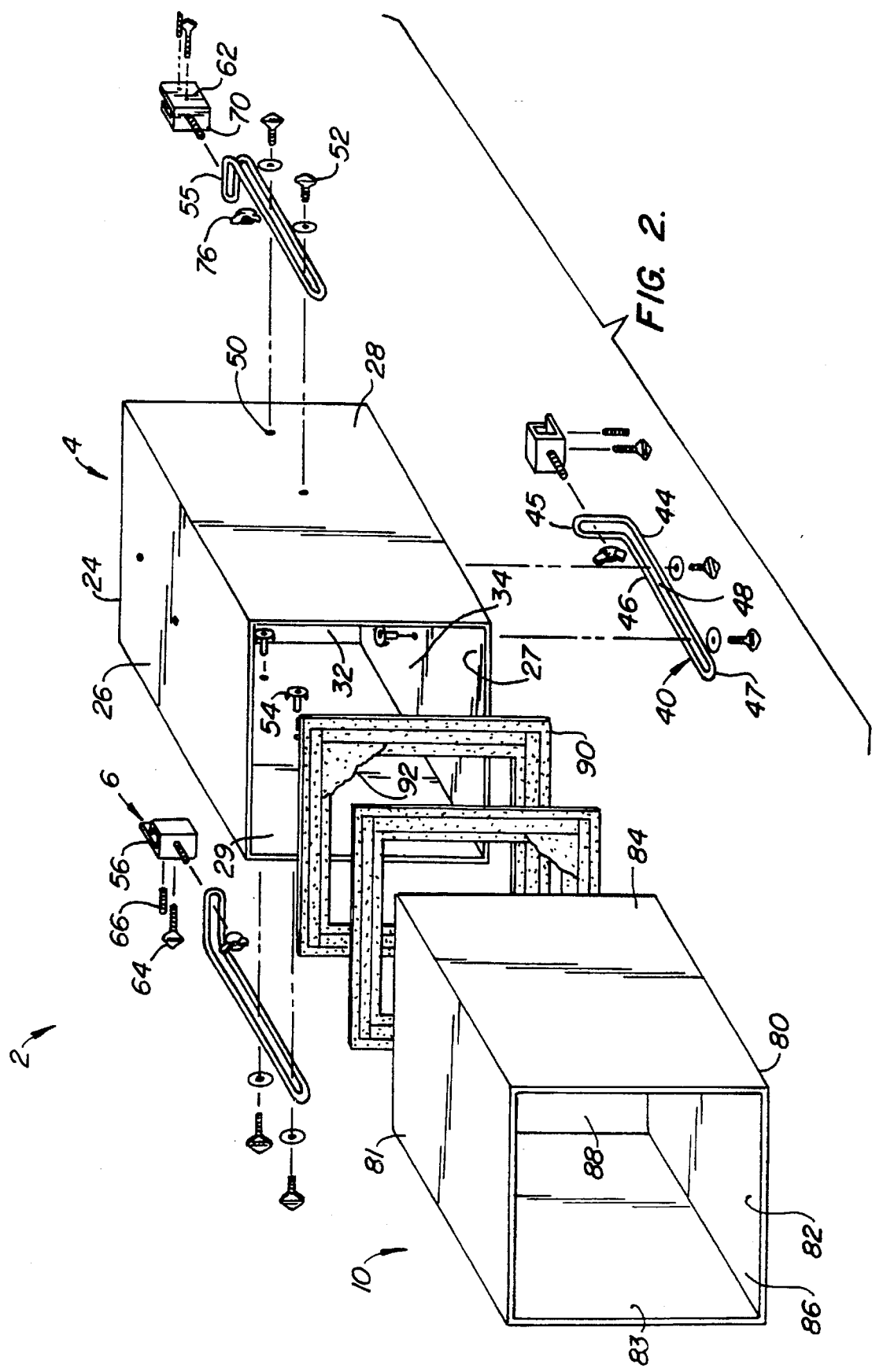

PORTABLE LIGHT DIFFUSER

FIELD OF THE INVENTION

This invention relates generally to equipment for controlling the light cast by photographic and non-photographic light sources and more particularly to a portable light diffuser for motion picture and still lighting fixtures.

BACKGROUND OF THE INVENTION

The lighting of television, motion picture and still photography scenes is a complicated art involving the practice of controlling and refining light with devices that diffuse, shadow and color the "raw" light. One such device, generally referred to as a light diffuser, is often used to spread out or soften the direct, concentrated light emitted from certain light sources, such as studio spotlights of all sorts. Typically, light diffusers comprise stationary or non-collapsible types of screens which are bulky and cumbersome. Unfortunately, it is frequently necessary or desirable to transport lighting equipment to various locations or to different positions on the set of a motion picture studio, for example. To accommodate this need for portability, some light diffusers may be disassembled into a more compact, disassembled form and then setup or reassembled at a different location. Such light diffusers, however, invariably include complicated internal supporting frameworks or rigid panels which require a time consuming and laborious process to assemble and disassemble.

Another drawback with existing light diffusers is that they are generally not that versatile. Some light diffusers include an adjustable stand which must be continually moved or readjusted whenever the light source is moved or redirected to illuminate different portions of the set. Other light diffusers, typically referred to as soft boxes, may be directly attached to a portion of a light source, such as the casing for a studio light, so that the diffuser generally moves with the studio light. However, these light diffusers are typically configured only for a particular light casing and, therefore, are not readily interchangeable with different light sources.

In some cases, it is desired to contain the diffused light somewhat or to direct the diffused light towards a general area, such as an object or person on the set. Because many conventional light diffusers consist of large bulky screens, the diffused light is typically controlled by positioning black panels or flags around the light diffuser to channel or contain the light within the desired area. These black flags are also generally bulky, cumbersome and non-portable. In addition, the flags must be repositioned whenever the light source is moved or redirected towards another portion of the set.

What is needed, therefore, is an improved system for controlling the light emitted from photographic and non-photographic light sources. The system should be compact and portable so that it can be quickly and easily moved to different locations. The system should also be configured for a wide variety of different light casings and, preferably, will attach directly onto the light casings so that it can be automatically moved with the light source. In addition, the system should include means for adjustably controlling the diffused light so that it can be contained or directed to a general area, if desired.

SUMMARY OF THE INVENTION

The present invention is directed to a system and method for controlling the light cast by a light source, such as a studio light. The invention provides an inexpensive and versatile light controlling apparatus that is collapsible so that it can be quickly assembled and disassembled for movement between different locations. In addition, the apparatus can be directly attached to and moved around with the light casing that houses the light source and is interchangeable with a wide variety of different light casings. The apparatus also includes a collapsible device for adjustably controlling the diffusion of the light that can be attached to and moved with the light diffuser and the light source.

In one aspect of the invention, a light controlling apparatus comprises a hollow tubular member or light diffuser having open opposite ends and a perimetrical wall with a light reflective inner surface for diffusing light passing therethrough. A support bracket extends along the outer surface of the perimetrical wall and a clamp couples the support bracket to the working end of the light casing. The support bracket helps to secure the light diffuser to the light casing so that the light diffuser does not have to be adjusted when the light source is moved around or redirected. The light diffuser is sufficiently stiff or rigid to be self-supporting, but is also collapsible into a compact, portable form so that it can be quickly and easily disassembled and reassembled.

In a preferred configuration, the light diffuser comprises opposed pairs of interconnected walls to form a generally rectangular body that functions as a soft box. The soft box has a light colored inner surface to facilitate diffusion of the light passing therethrough. In addition, frames for holding light controlling filters, such as colored screens or gels, for example, may be suitably positioned within the soft box to diffuse or color the light. In one advantageous configuration, the frames have double sided tape on either side to facilitate mounting the light controlling filters thereon. Preferably, support brackets are attached to at least two sides of the box and coupled to clamps that secure the soft box to an annular flange or ear of the light casing. The clamps have a mounting bracket that can be adjusted for a variety of different light casings so that the light diffuser may be used with various light sources.

The light controlling apparatus preferably includes a second, hollow, tubular member slidably coupled to the outer surface of the soft box on the end opposite the light casing. Preferably, the second tubular member functions as a light container or a snoot having a dark colored inner surface to contain and direct the light emanating from the soft box. The snoot is sufficiently rigid to telescope with the soft box, thereby adjusting the amount of diffusion of the light, but is also collapsible into a compact, portable form for movement to different locations.

The above is a brief description of some deficiencies in the prior art and advantages of the present invention. Other features, advantages and embodiments of the invention will be apparent to those skilled in the art from the following description, accompanying drawings and appended claims.

BRIEF DESCRIPTION OF THE DRAWINGS

FIG. 2 is an exploded view of the light controlling apparatus of FIG. 1 showing a collapsible soft box and snoot in an expanded, operational configuration according to the principles of the present invention;

DESCRIPTION OF THE PREFERRED EMBODIMENTS

Figure 1:
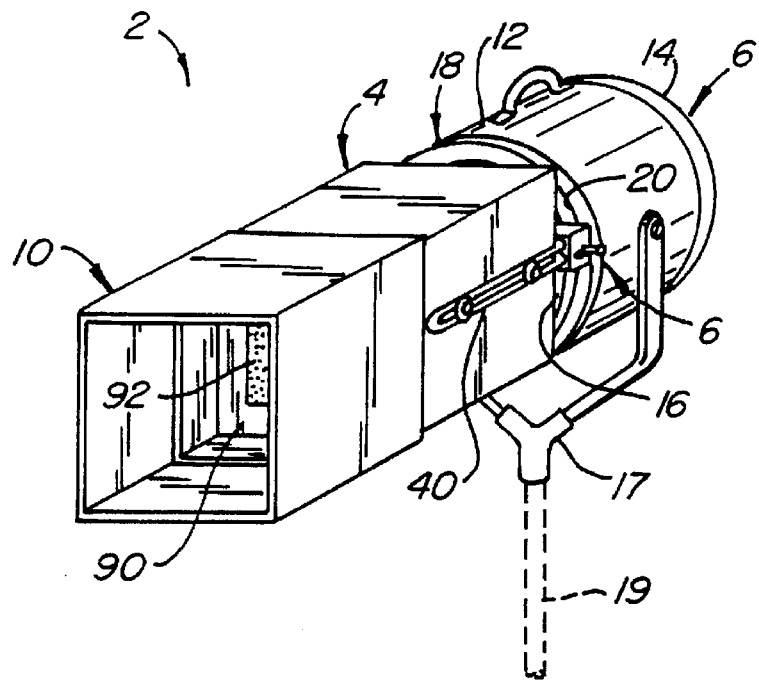
FIG. 1 is a perspective view of a light controlling apparatus connected to a studio light in accordance with the principles of the present invention.

Referring to the drawings in detail, wherein like numerals indicate like elements, a light controlling apparatus 2 is illustrated according to the principles of the invention. Light controlling apparatus 2 generally includes a light diffuser or soft box 4, a clamp 6 for attaching soft box 4 to a studio light 8 and a light container or snoot 10 slidably coupled to the soft box.

Figure 3:
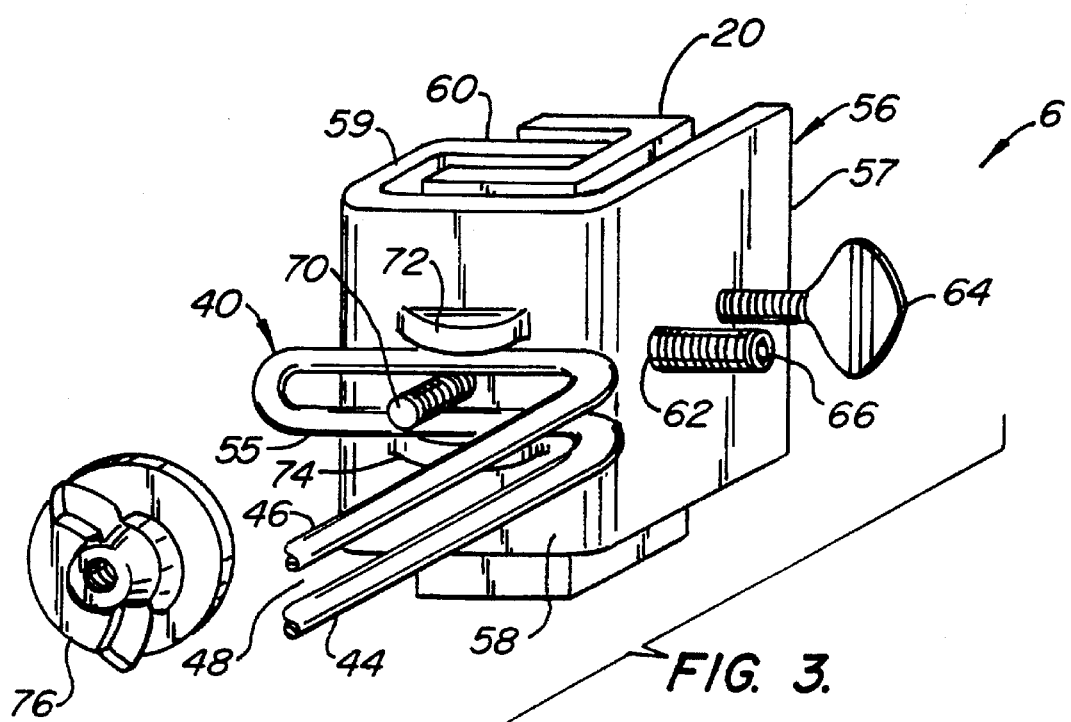
FIG. 3 is an enlarged view of an adjustable clamp and a support bracket for removably attaching the soft box of FIG. 2 to the studio light of FIG. 1.

As shown in FIG. 1, studio light 8 comprises a light source (not shown) housed within a light casing 12, as is conventional in the art. Light casing 12 is a generally cylindrical housing having a closed end 14 and an open or working end 16 for directing light from the light source through working end 16 of studio light 8. Studio light 8 includes a yoke 17 for attaching casing 12 to a stand 19 (shown in dotted lines) in a conventional manner. Working end 16 includes a frame 18 with an annular flange 20. As shown in FIG. 3, annular flange 20 is generally U-shaped and is often referred to as an "ear" in the motion picture industry. Many conventional studio lights have an "ear" or a similar type of flange around the working end of the light casing. It should be understood, however, that although light controlling apparatus 2 is shown and described in a particular configuration with a particular studio light, it is not intended to be limited in that manner. That is, light controlling apparatus 2 can be used with other light fixtures and in other configurations, such as video or still cameras for photography, light guns or light painting wands for producing special lighting and shadow effects, or other conventional lighting equipment.

Referring to FIG. 2, soft box 4 comprises a tubular member 24 defined by a top wall 26, a bottom wall 27 and opposing side walls 28, 29 connected together or integral along their contiguous edges. Preferably, all four walls have a generally rectangular shape to form a hollow, square box with opposing open ends 32, 34. Walls 26–29 are formed of a material which has sufficient stiffness to maintain tubular member 24 in open, tubular form when soft box 4 is mounted on studio light 8 (see FIG. 1). Walls 26–29 may also be folded to collapse tubular member 24 into a compact, flattened form for easy portability. Of course, one skilled in the art will readily recognize that the invention is not limited to a square soft box and soft box 4 can have cylindrical, conical, rectangular or a variety of other shapes, if desired. In addition, soft box 4 may be longer or shorter than depicted in the figures, depending on the desired lighting effect.

Soft box 24 is formed of opaque material to prevent light from passing through top, bottom and side walls 26–29. The inner surfaces of walls 26–29 are light-reflective so as to reflect any light from studio light 8 outwardly towards open end 34. In a preferred configuration, soft box 4 is formed of corrugated cardboard with a light colored inner surface, e.g., white. The light color helps to diffuse the light travelling therethrough. When soft box 4 is attached to working end 16 of light casing 12 (FIG. 1), substantially all of the light emitted from the light source passes through soft box 4 and is thereby diffused or softened as it passes outwardly through open end 34.

As shown in FIG. 2, light controlling apparatus 2 further includes three support brackets 40, each comprising two, generally parallel, wire support rods 44, 46 that meet at ends 45, 47 of support bracket 40 and define a longitudinal gap 48 therebetween. In a preferred configuration, side walls 28, 29 and bottom wall 27 of soft box 4 each have a number of holes 50, e.g., two on each wall, for receiving fasteners, such as screws 52. Of course, light controlling apparatus 2 may include a support bracket on all four walls, or on only one or two walls, if desired. Alternatively, more than one support bracket can be provided for each wall. However, it has been found that three support brackets, one on each wall, adequately support soft box 4 in a fixed orientation to studio light 8 during operation of the light (i.e., when the light is moved around or redirected to different portions of the set).

To secure support brackets 40 to soft box 4, support brackets 40 are positioned against the side and bottom walls so that holes 50 are disposed in gap 48 between support rods 44, 46. Preferably, holes 50 are aligned with each other so that support brackets 40 will be generally parallel to the longitudinal axis of soft box 4. This helps to ensure that soft box 4 will remain parallel to light casing 12 when it is attached thereto, as discussed below. Screws 52 are then passed through gap 48 and holes 50 and tightened with lock nuts 54 on the inner surface of tubular member 24. Preferably, support brackets 40 will extend along a substantial portion of soft box 4 to provide adequate support for the cardboard soft box 4 (see FIG. 1).

As shown in FIG. 3, support rods 44, 46 are bent to form an end portion 55, which is preferably perpendicular to the rest of support bracket 40, for mounting to clamp 6. Clamp 6 comprises a mounting bracket, such as an ear bracket 56, that is shaped to conform to U-shape flange 20 of light casing 12. In a preferred configuration, ear bracket 56 includes first, second, third and fourth, generally perpendicular, interconnected wall sections 57–60. First wall section 57 has holes 62 for receiving fasteners, such as a thumb screw 64 and an allthread screw 66. Thumb and allthread screws 64, 66 tighten ear bracket 56 against flange 20 and ensure that first wall section 57 is generally level with the corresponding portion of flange 20. This helps to ensure that support brackets 40 and soft box 4 will be generally parallel to the light beam emitted from studio light 8.

Second, third and fourth wall sections 58–60 wrap around one leg of U-shaped flange 20 so that, when first wall section 57 is tightened, mounting bracket 56 is secured to light casing 12. A guide screw 70 extends outward from second wall section 58. As shown in FIG. 3, upper and lower support surfaces or bosses 72, 74 are disposed above and below guide screw 70 to ensure that support rod 44 does not pivot about guide screw 70. To secure support brackets 40 to their corresponding clamps 6, perpendicular portion 55 of each support bracket 40 is slid over guide screw 70 so that support rods 44, 46 are disposed between bosses 72, 74 and screw 70 and a knurled finger nut or wing nut 76 is tightened onto screw 70.

Referring again to FIG. 2, snoot 10 comprises a hollow, tubular member 80 having top, bottom and side walls 81–84 and opposing open ends 86, 88. Walls 81–84 are generally rectangular, each having a width that is slightly larger than the width of the corresponding wall of soft box 4 so that snoot 10 can slide over the outer surface of soft box 4, as shown in FIG. 1. Of course, snoot 10 may have configurations other than square and will generally conform to the shape of soft box, i.e., rectangular, square, conical, cylindrical, etc. Snoot 10 is preferably constructed of a collapsible material that will maintain sufficient stiffness when snoot 10 and soft box 4 are mounted onto studio light 8. In a preferred configuration, snoot 10 comprises a corrugated cardboard having an inner surface that is dark-colored, preferably black. The dark color helps to contain or direct the diffused light exiting soft box 4. By telescoping snoot 10 back and forth over soft box 4, the user can control the amount of diffusion of the light passing through soft box 4. This allows the user to contain and/or direct the light in a general direction, e.g., towards an object or person on the set.

As shown in FIGS. 1 and 2, light controlling apparatus 2 further includes one or more frames 90 that are sized to slide within soft box 4. Frames 90 can hold any of a variety of plates, screens or colored gels for controlling the quality, color or amount of diffusion of the light passing through soft box 4. Alternatively, the plates or screens may have slots or shaped openings for controlling the size and shape of the light exiting soft box 4. In a preferred configuration, a diffusion screen 92 is mounted to frames 90 to diffuse the light passing therethrough, as shown in FIG. 2. An advantageous feature of the present invention is that frames 90 can be controllably positioned within soft box 4 to control the effects that the screens 92 will have on the light from studio light 8. Preferably, frames 90 are constructed of cardboard with double sided tape on either or both sides of the frame. A non-stick peel layer (not shown) covers the double sided tape for shipping and handling before use. To use frames 90, the user simply peels off the layer, places the frame on a sheet of filter material (not shown) and presses the frame in place.

The method of securing light controlling apparatus 2 to studio light 8 will now be described. As discussed above, soft box 4 can be folded into a collapsed position for movement between locations. To assemble the device, soft box 4 is expanded from its collapsed position, preferably by unfolding soft box 4 along the fold lines formed between walls 26-29. Lock nuts 54 are then inserted into holes 50 and support brackets 40 are aligned with the holes, as shown by the lines in FIG. 2. Screws 52 are loosely secured to lock nuts 54 so that support brackets 40 are attached to and slidably coupled with soft box 4. Mounting brackets 56 are then secured to suitable points on U-shaped flange 20 of studio light 8, as described above. To secure soft box 4 to studio light 8, support brackets 40 are slid toward studio light 8 (with respect to soft box 4) to provide room between soft box 4 and studio light 8 and wing nuts 76 are tightened to affix support brackets 40 to mounting brackets 56 (see FIG. 3). Soft box 4 is then slid firmly up against studio light 8 and screws 52 are tightened to secure support brackets 40 to soft box 4.

Figure 4:
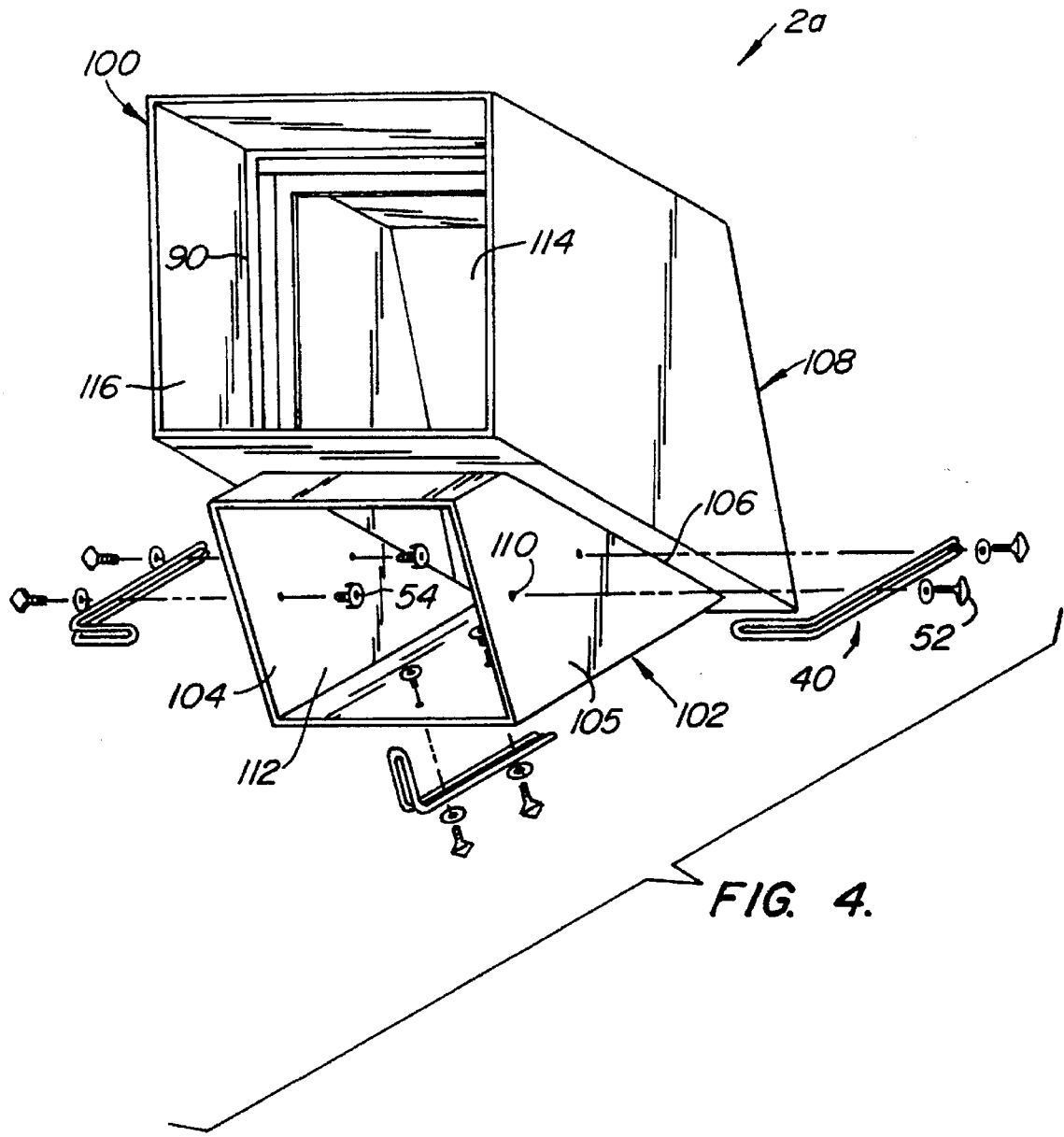
FIG. 4 is an alternative embodiment of the soft box of FIG. 2 for redirecting or bouncing light from a light source, such as the studio light of FIG. 1.

FIG. 4 illustrates an alternative embodiment of light controlling apparatus 2 for diffusing and redirecting or bouncing light from a light source, such as studio light 8. In this embodiment, a light controlling apparatus 2a comprises a light diffuser or bounce box 100 having a mounting box 102 with side walls 104, 105. Side walls 104, 105 each has an inclined edge 106 coupled to a guide box 108. Mounting box 102 has a number of holes 110 for attachment to support brackets 40 as described above and an open end 112 configured to abut against working end 16 of studio light 8 so that light from light source passes through mounting box 102 and into guide box 108. As shown in FIG. 4, guide box 108 has an inclined wall 114 for bouncing the light from mounting box 102 through an open end 116 of guide box 108. Of course, guide box 108 may comprise a number of inclined walls and may redirect the light to any direction or the light may be split into a number of different directions. Mounting and guide boxes 102, 108 are both constructed of corrugated cardboard with white, light-reflective inner surfaces to diffuse the light passing therethrough. In addition, frames 90 are preferably fitted within guide box 108 and snoot 10 is telescoped over the outer surface of guide box 108 to adjust the diffusion of the light similar to the preferred embodiment (see FIGS. 1 and 2).

The above is a detailed description of various embodiments of the invention. It is recognized that departures from the disclosed embodiments may be made within the scope of the invention and obvious modifications will occur to a person skilled in the art. The full scope of the invention is set out in the claims that follow and their equivalents. Accordingly, the claims and specification should not be construed to unduly narrow the full scope of protection to which the invention is entitled. For example, snoot 10 and soft box 4 do not have to be mounted directly to studio light 8. Clamp 6 may be attached to a yoke or directly secured to an adjustable stand so that the light controlling apparatus can be moved independently of the studio light.

What is claimed is:

1. A light controlling apparatus configured for connection to and use with a light source housed within a casing for directing light from the light source through a working end of the casing, the apparatus comprising:
   a generally hollow member open at opposite ends and comprising a perimetrical wall with inner and outer surfaces, the perimetrical wall being formed of opaque material having a light-reflective surface on the inner surface for diffusing light passing therethrough;
   a support bracket coupled to and extending along a portion of the outer surface of the perimetrical wall; and
   an adjustable clamp coupled to the support bracket and configured for removably fastening the support bracket to the working end of the casing such that the hollow member is fixed to the working end of the casing for movement therewith and a substantial portion of the light from the light source is directed through the hollow member in a first direction.

2. The apparatus of claim 1 wherein the hollow member is collapsible into a compact, flattened form for portability.

3. The apparatus of claim 1 wherein the perimetrical wall is sufficiently stiff to maintain the hollow member in an open tubular form when the hollow member is connected to the casing.

4. The apparatus of claim 1 wherein the hollow member comprises opposed pairs of interconnected walls to form a generally square box having first and second open ends, the light being directed along a substantially straight path through the first and second open ends.

5. The apparatus of claim 1 wherein the hollow member is a soft box and the perimetrical wall is substantially white to diffuse light passing through the soft box.

6. The apparatus of claim 4 further including second and third support brackets, each support bracket extending from the first open end along an outer surface of one of the interconnected walls substantially toward the second open end to secure the hollow member to the casing.

7. The apparatus of claim 6 further including second and third adjustable clamps coupling the second and third support brackets, respectively, to the working end of the casing.

8. The apparatus of claim 1 wherein the support bracket comprises first and second interconnected parallel support rods having a longitudinal gap therebetween, the apparatus further including at least one fastener disposed within the gap for securing the support rods to the hollow member.

9. The apparatus of claim 1 wherein the working end of the casing has a perimetrical flange, the adjustable clamp comprising a mounting bracket and a fastener tightening the mounting bracket to a portion of the perimetrical flange, the mounting bracket being configured to conform to a variety of different sized flanges.

10. The apparatus of claim 9 wherein the mounting bracket includes a fastener securing the support bracket to the mounting bracket and the support surfaces of the mounting bracket for bracing the support bracket such that the support bracket is prevented from pivoting around the fastener.

11. The apparatus of claim 1 further including a second hollow member configured to telescope over the outer surface of the first hollow member for adjusting an amount of diffusion of the light passing through the first hollow member.

12. The apparatus of claim 11 wherein the second hollow member is a rectangular box having substantially black walls.

13. The apparatus of claim 11 wherein the support bracket is configured to support the first and second hollow members in a fixed angular orientation with respect to the casing.

14. The apparatus of claim 1 further including a frame slidably disposed within the hollow member and a light filter mounted to the frame to intercept the light travelling through the hollow member.

15. The light of claim 1 wherein the hollow member comprises first and second open ends, the hollow member redirecting the light passing therethrough such that the light exits the second open end in a second direction.

16. The light of claim 15 wherein the hollow member is a bounce box and the second direction is greater than 90 degrees from the first direction.

17. A light controlling apparatus adapted for connection to and use with a light source disposed in a casing for directing light from the light source through a working end of the casing, the apparatus comprising:

a first hollow member open at opposite ends and comprising opposed pairs of interconnected walls having inner and outer surfaces, the walls being formed of opaque material having a light-reflective surface on the inner surfaces for diffusing light passing therethrough;

a second hollow member open at opposite ends and comprising opposed pairs of interconnected walls formed of a dark opaque material, the second hollow member slidably coupled to the outer surface of the first hollow member for adjustably containing diffused light exiting the first hollow member;

means for removably mounting the first hollow member to the working end of the casing such that a substantial portion of the light from the light source passes through the first and second hollow members;

a frame slidably disposed within the first hollow member;

a light filter mounted to the frame to intercept light traveling through the first hollow member; and wherein the mounting means comprises a number of support brackets coupled to an outer surface of one of the interconnected walls and a number of adjustable clamps fixing the support brackets to the casing for movement therewith.

18. The apparatus of claim 17 wherein the first and second hollow members are collapsible.

19. The apparatus of claim 17 wherein the light filter is a colored screen for diffusing the light.

20. The apparatus of claim 17 wherein the light filter is a colored gel for diffusing the light.

21. The apparatus of claim 17 wherein the second hollow member is telescopically displaceable over the first hollow member to control an amount of diffusion of the light.

22. The apparatus of claim 17 wherein the first hollow member is a soft box and the interconnected walls of the first hollow member are white to diffuse light passing through the soft box.

* * * * *